United States Patent
West et al.

(10) Patent No.: US 7,983,026 B2
(45) Date of Patent: Jul. 19, 2011

(54) TOUCH PANEL CRADLE

(75) Inventors: William B. West, Sandy, UT (US); Paul E. Nagel, Sandy, UT (US); Roger T. Johnsen, Salt Lake City, UT (US); Brent D. Madsen, Providence, UT (US)

(73) Assignee: Control4 Corporation, Draper, UT (US)

( * ) Notice: Subject to any disclaimer, the term of this patent is extended or adjusted under 35 U.S.C. 154(b) by 1532 days.

(21) Appl. No.: 11/218,894

(22) Filed: Sep. 2, 2005

(65) Prior Publication Data
US 2006/0055681 A1 Mar. 16, 2006

Related U.S. Application Data

(60) Provisional application No. 60/607,120, filed on Sep. 3, 2004.

(51) Int. Cl.
- *H05K 5/00* (2006.01)
- *A47B 67/02* (2006.01)
- *A47B 88/00* (2006.01)
- *H04N 5/64* (2006.01)
- *G06F 3/041* (2006.01)
- *G09F 7/00* (2006.01)

(52) U.S. Cl. .......... 361/679.01; 312/245; 312/310; 312/319.1; 348/836; 345/173; 40/611.03

(58) Field of Classification Search ............ 40/725, 40/740, 739, 794, 611, 611.03, 722, 765; 312/212, 242, 245, 310, 319.1; 348/836; 345/156, 157, 168, 169, 173–178; 235/376, 235/379–381; 343/702; 361/679.01–679.45, 361/679.55–679.59, 724–727, 741, 754, 361/756; 160/85; 340/825.24, 825.25, 825.69, 340/825.72; 341/172; 200/512; 455/345–351, 455/90.1–90.3, 128

See application file for complete search history.

(56) References Cited

U.S. PATENT DOCUMENTS

| | | | |
|---|---|---|---|
| 6,380,899 B1 | 4/2002 | Madsen et al. | |
| 6,445,577 B1 | 9/2002 | Madsen et al. | |
| 6,538,880 B1 * | 3/2003 | Kamijo et al. | 361/679.4 |
| 6,633,347 B2 * | 10/2003 | Kitazawa | 348/837 |
| 6,667,759 B2 | 12/2003 | Gerszberg et al. | |
| 6,688,518 B1 * | 2/2004 | Valencia et al. | 235/379 |
| 6,901,987 B1 | 6/2005 | Graham | |
| 7,267,613 B2 * | 9/2007 | Cole | 463/20 |
| 7,471,804 B2 * | 12/2008 | Lee | 381/388 |
| 2003/0095374 A1 | 5/2003 | Richardson | |
| 2004/0163294 A1 * | 8/2004 | Hsu | 40/611.03 |
| 2005/0174727 A1 | 8/2005 | Thomas et al. | |
| 2005/0195560 A1 | 9/2005 | Kim | |

FOREIGN PATENT DOCUMENTS
WO WO 2004/008649 1/2004

\* cited by examiner

*Primary Examiner* — Jayprakash N Gandhi
*Assistant Examiner* — Nidhi Desai
(74) *Attorney, Agent, or Firm* — Thorpe North & Western LLP

(57) ABSTRACT

A surface-mount touch panel cradle is disclosed for use in electrically controlling remote components. The surface-mount touch panel cradle comprises a surface mounted receptacle. A cradle frame can be coupled to the receptacle. A frame biasing mechanism can be configured to move the cradle frame away from the information mount to enable the touch panel to be inserted and removed from the receptacle. An electrical connection can be located within the receptacle. The electrical connection can be configured to be electrically coupled to the touch panel.

18 Claims, 5 Drawing Sheets

TOUCH PANEL CRADLE

CROSS-REFERENCE TO RELATED APPLICATIONS AND CLAIM OF PRIORITY

Priority to U.S. Provisional patent application Ser. No. 60/607,120 filed on Sep. 3, 2004 is claimed.

FIELD OF THE INVENTION

The present invention relates generally to home automation control systems.

BACKGROUND

The price of electronic devices has continued to decrease dramatically. In addition, the types of consumer electronic components and home automation electronics that can be purchased have also continued to increase. For example, DVD players, large screen TVs, multi-carousel CD players, MP3 players, new video games consoles and similar consumer electronic items have continued to drop in price and become more widely available. Other brief examples of home electronics that are available include wireless networks, wireless power controls, fireplaces, garage doors, alarm systems, lighting systems, and even networked appliances. These factors have made home audio, home video, and home automation electronics more available to users.

The availability of large screen TVs, surround-sound stereo equipment, DVDs, CDs, MP3s and similar electronic production equipment has also increased consumer's interest in home theater systems. It has become easier and less expensive to buy many interconnecting components that can be used to provide high quality movies, music, broadcast television, satellite programs, cable programs, Internet connections, and other electronic media components for a home.

The number of controls used to operate electronic devices increases with the number of electronic devices in a home. It is not uncommon for a home theater system to have a television, a DVD player, a VCR, a stereo tuner, a CD player, a digital video recorder such as a TiVo, a cable box, and a satellite controller. Each of these devices typically comes with its own remote control. Other devices in a home automation system that can be remotely controlled may include lighting, a retractable movie screen, a video projector, heating and air conditioning, and even an alarm system. Controlling each device with its own remote can be unwieldy.

To decrease the number of remote controls necessary to operate home automation systems and other devices throughout a home, universal remote controls have been created. Modern universal remote controls can consist of a device with a liquid crystal display (LCD) touch panel screen. The touch panel can be configured using software to operate each of the numerous electronic devices throughout a home. However, the cost and complexity of universal remote controls quickly increases with the demand to be able to operate the ever growing list of electronic devices. A large home may need more than one universal remote to operate the many electronic devices. Unfortunately, the relatively high cost of a broadly functioning universal remote control can make the cost of purchasing several controls somewhat prohibitive.

SUMMARY

A surface-mount touch panel cradle is disclosed for use in electrically controlling remote components. The surface-mount touch panel cradle comprises a surface mounted receptacle. A cradle frame can be coupled to the receptacle. A frame biasing mechanism can be configured to move the cradle frame away from the information mount to enable the touch panel to be inserted and removed from the receptacle. An electrical connection can be located within the receptacle. The electrical connection can be configured to be electrically coupled to the touch panel.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein.

Reference will now be made to the exemplary embodiments illustrated, and specific language will be used herein to describe the same. It will nevertheless be understood that no limitation of the scope of the invention is thereby intended.

DETAILED DESCRIPTION OF EXAMPLE EMBODIMENTS

The present invention, in the various embodiments disclosed, provides at least one surface mount cradle for use with a portable touch panel such as a web pad. As used herein, the term "surface mount" includes an object mounted on or in a surface. The surface mounted object can be embedded in or below the surface, substantially flush with the surface, or protruding from the surface. The term "touch panel" can include any remote control configured to operate one or more or more different types of electronic devices. The touch panel can include remote controls having separate physical buttons as well as remote controls having a touch activated electronic screen.

The surface mount cradle can be mounted within or on a surface such as a wall, cabinet, counter top, and the like, preferably in a high traffic area within a home, business, or warehouse. The surface mount cradle creates a convenient area for the touch panel to be stored, recharged, and/or used. The cradle can also provide a wired communications link to the touch panel that is higher-speed than the touch panel's wireless mode which is used when the touch panel is not docked in the cradle. Several surface mount cradles can be located throughout a structure, allowing a touch panel to be placed at any of the several locations of the surface-mount cradles. When the touch panel is removed from any of the surface-mount cradles, a display object can be shown. A decorative frame can also surround the cradle. The display object and decorative frame can enable the surface mount cradle to be an aesthetically pleasing addition to the structure's décor when the touch pad is not in place.

Figure 1:
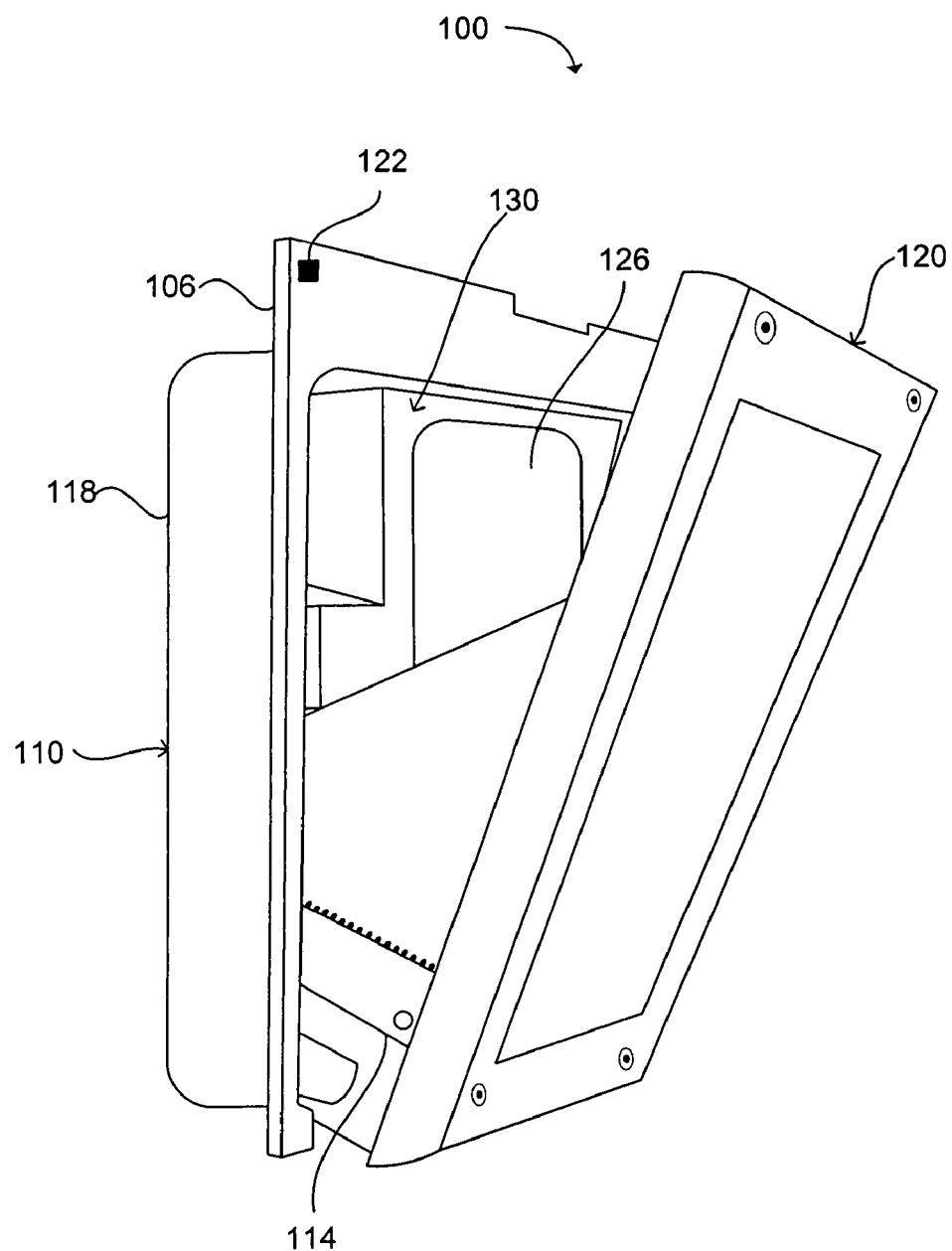
FIG. 1 shows a view of the surface-mount cradle from the side with a back-box visible in accordance with an embodiment for the present invention

A surface-mount touch panel cradle 100 is shown in FIG. 1. The surface mount cradle comprises a receptacle 110 with a cradle frame 120 coupled to the receptacle. A display mount 130 can be located within the receptacle and configured to move or slide away from the cradle frame to allow a touch panel to be received within the receptacle. The display mount can be biased to be substantially flush with the cradle frame when the touch panel is removed from the receptacle and the cradle frame is in a closed position.

A frame biasing mechanism 114 can be configured to move the cradle frame 120 away from the display mount 130 to enable the touch panel to be inserted and removed from the receptacle 110. The frame biasing mechanism can be formed from a spring, a pneumatic mechanism, a hydraulic mechanism, an electric motor, or any other type of biasing means to enable the cradle frame to be moved away from the display mount so that the touch panel can be inserted and removed from the receptacle. The cradle frame may also be moved away from the display mount by attaching one side of the cradle frame to the receptacle and rotating an opposite side of the cradle frame away from the display mount using the frame biasing mechanism. A mechanical and/or electric latching mechanism 122 can be used to secure the cradle frame to the receptacle when the cradle frame is in a closed position.

The receptacle 110 can include a housing 118 and a surface mount 106 or mounting flange that is configured to enable the receptacle to be securely mounted to a surface. The housing can have a back surface to enable the receptacle to be substantially enclosed. Alternatively, the housing can have an open panel. The display mount 130 can be carried within the receptacle. The display mount can include a display object 126 coupled to the display mount. A display biasing mechanism (not shown) can be coupled between the receptacle and the display mount to enable the display mount to be substantially flush with the cradle frame when the touch panel is removed and the cradle frame is in a closed position. The display biasing mechanism can be a spring, a pneumatic mechanism, a hydraulic mechanism, an electric motor, or any other type of biasing means to enable the display mount to be moved toward the cradle frame when the touch panel is removed from the receptacle. The display mount can move away from the cradle frame when the touch panel is inserted to allow the touch panel to be located between the cradle frame and the display mount.

Figure 2:
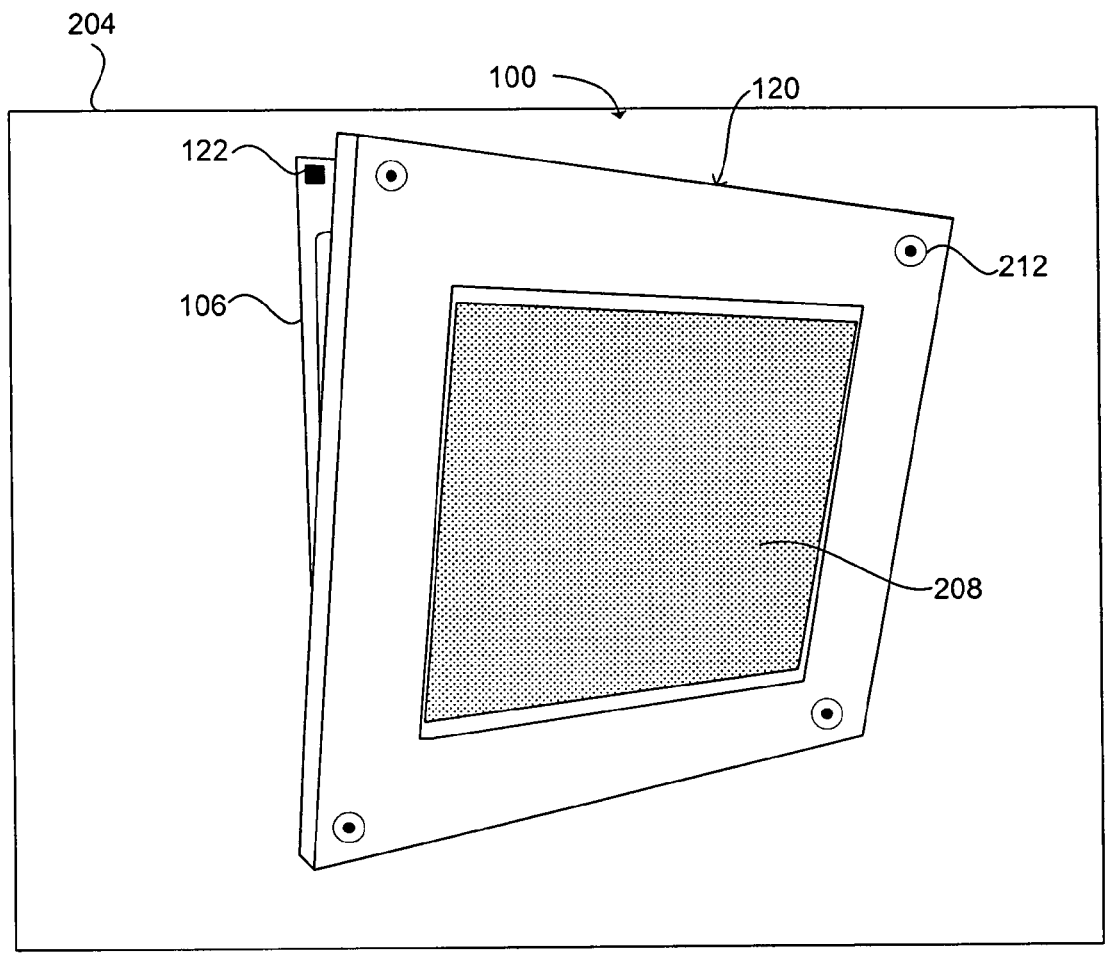
FIG. 2 shows a touch panel in the cradle frame with the frame in a half-way ejected position in accordance with an embodiment of the present invention.

FIG. 2 shows the surface-mount touch panel cradle 100 mounted to a surface 204 using the surface mount 106. Alternatively, the surface mount can be embedded in, flush with, or protruding from the surface. The cradle frame 120 can be released from the latch 122 using electrical or mechanical means. For example, a person may apply pressure to the cradle frame to release the latch, allowing the frame biasing mechanism to move and/or rotate the frame away from the surface 204. Alternatively, electrical means such as a button on the frame, a remote control, or the touch panel may be used to electronically release the latch and allow the frame to be moved and/or rotated away from the surface. The touch panel 208 can then be removed from the surface-mount touch panel cradle. In one embodiment, the cradle frame can have external frame connectors 212 configured to enable an external frame to be securely coupled to the cradle frame.

Figure 3:
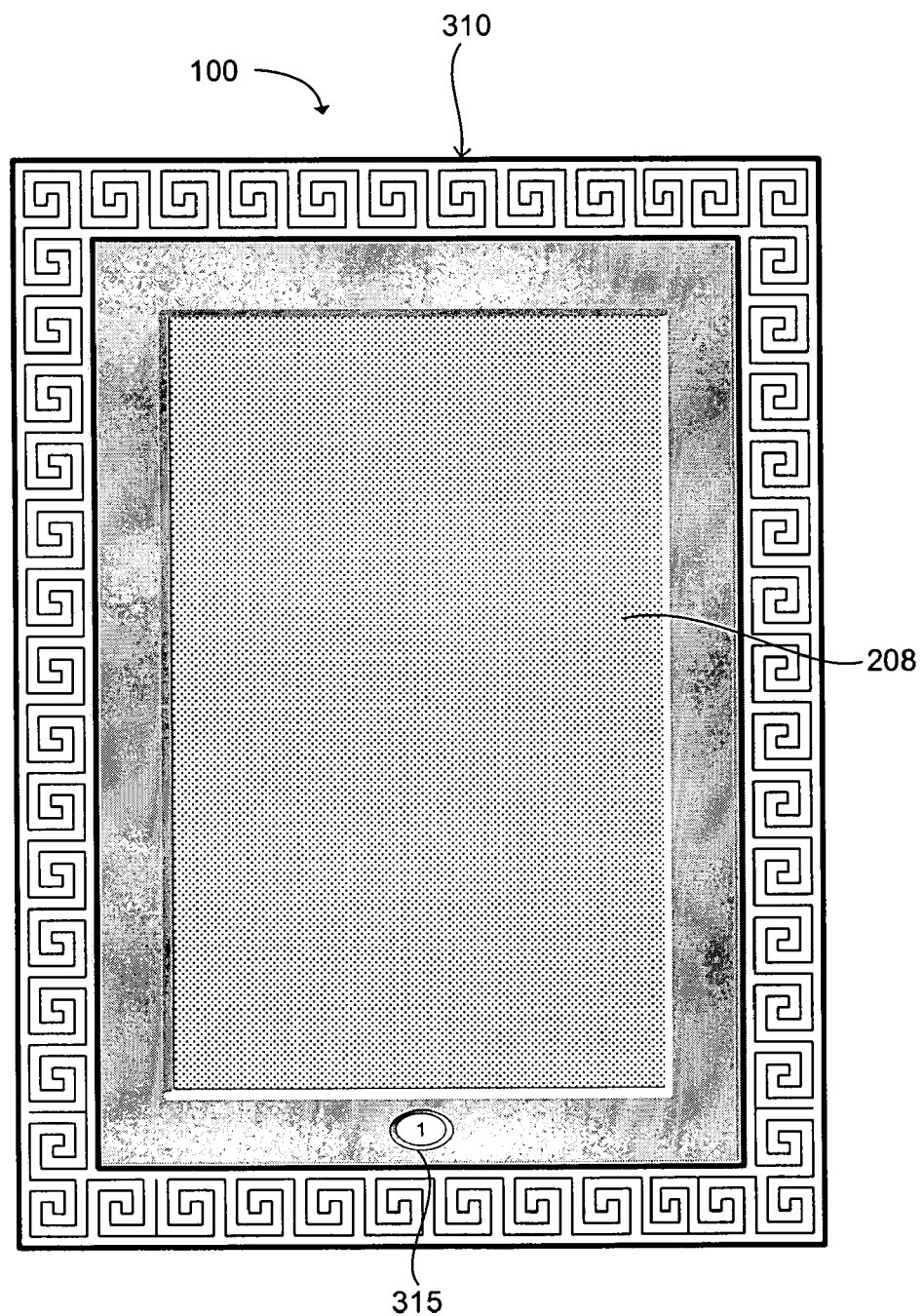
FIG. 3 shows a touch panel in the cradle frame with the frame in a closed position in accordance with an embodiment of the present invention.

An external frame 310 is configured to be coupled to the cradle frame, as shown in FIG. 3. Many types of decorative frames can be made available to allow the surface-mount touch panel cradle to blend with surrounding décor and the taste of the owner. In another embodiment, mechanical specifications can be provided to an installer or owner to allow them to have a custom frame fabricated that would interface properly with and attach to the cradle frame. The cradle frame 120 (FIG. 1) and any attached external frame 310 can have an open central area to allow the touch panel 208 to be accessed when it has been placed within the surface-mount touch panel cradle 100.

An electrical connection can be located within the receptacle. The electrical connection can be configured to be electrically coupled to the touch panel. The electrical connection can comprise an electrical source for supplying power to the touch panel. The power supply can also be used to recharge an energy source, such as a battery, that is located within the touch panel. The electrical connection may further include a signal source or network connection for communicating with electronic objects external to the receptacle. The signal source can be communicated wirelessly between the touch panel and the cradle. Alternatively, the touch panel can be electrically connected directly to the touch panel.

When two or more surface-mount touch panel cradles 100 are installed within a structure, it can become more difficult to know where the touch panel is located. For example, a large house may have three, four, or even more different surface-mount touch panel cradles located throughout the house on different floors. To enable a user to quickly locate the touch panel when it is installed in one of the surface-mount cradles, each cradle can be in communication with other surface-mount cradles located throughout the structure. When the touch panel is loaded within one of the cradles, the loaded cradle can communicate with the empty cradles located about the structure. The empty cradles can receive the communication and display the cradle in which the touch panel is located. Each surface-mount touch panel cradle can include an indicator 315 that can show that the touch panel is located. For example, a home having three surface-mount touch panel cradles installed, with one cradle on each floor, can identify each cradle according to a number. The cradle on the first floor can be labeled 1, with 2 on the second floor and 3 on the $3^{rd}$ floor. When the touch panel is located in the cradle on the first floor, each surface-mount touch panel cradle can display a 1 in the indicator that can show that the touch panel is located in cradle 1, in this example the cradle on the first floor. The owner can then know where to find the touch panel.

Figure 4:
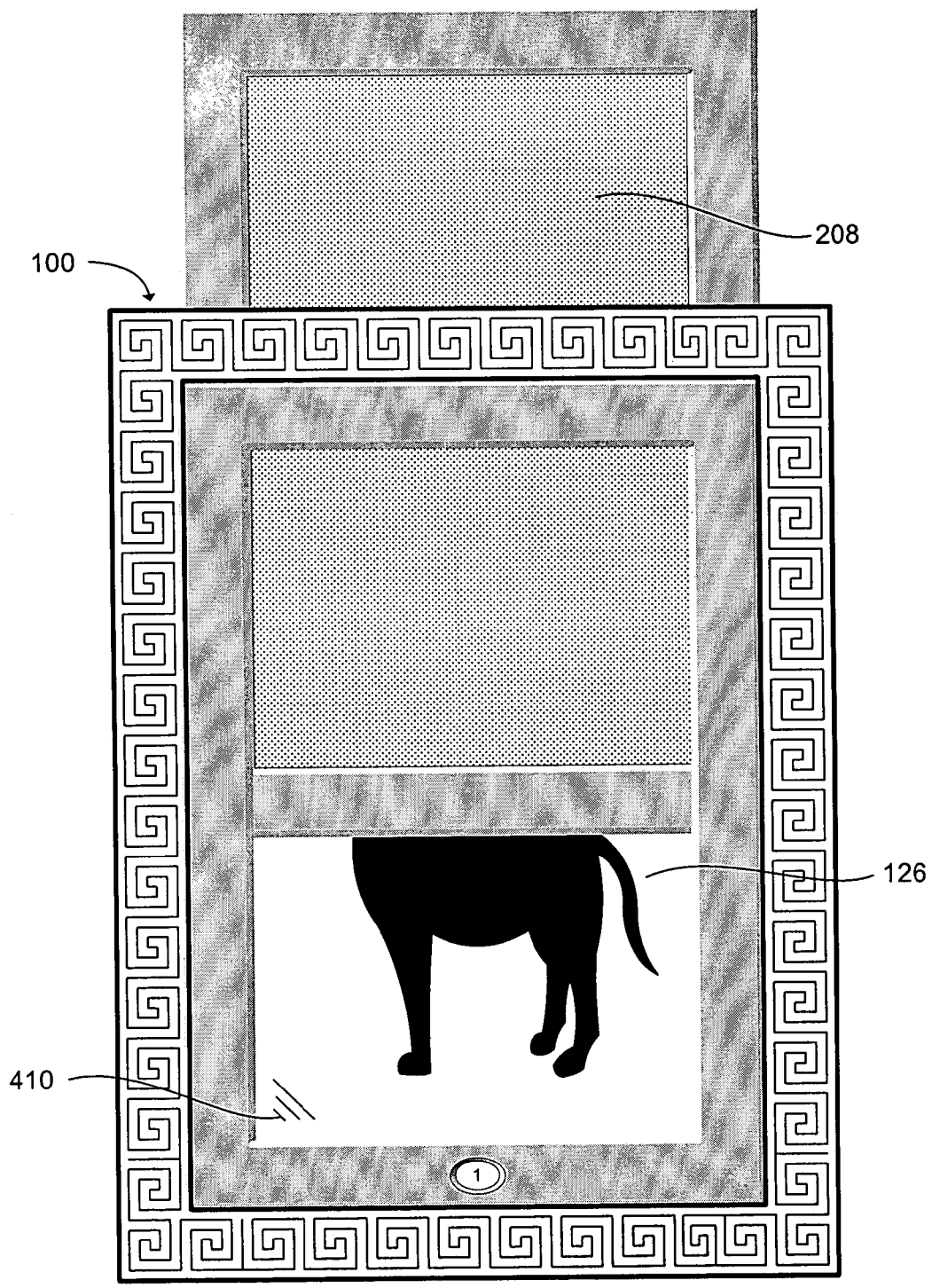
FIG. 4 shows a touch panel being removed from the surface mounted receptacle in accordance with an embodiment of the present invention.
Figure 5:
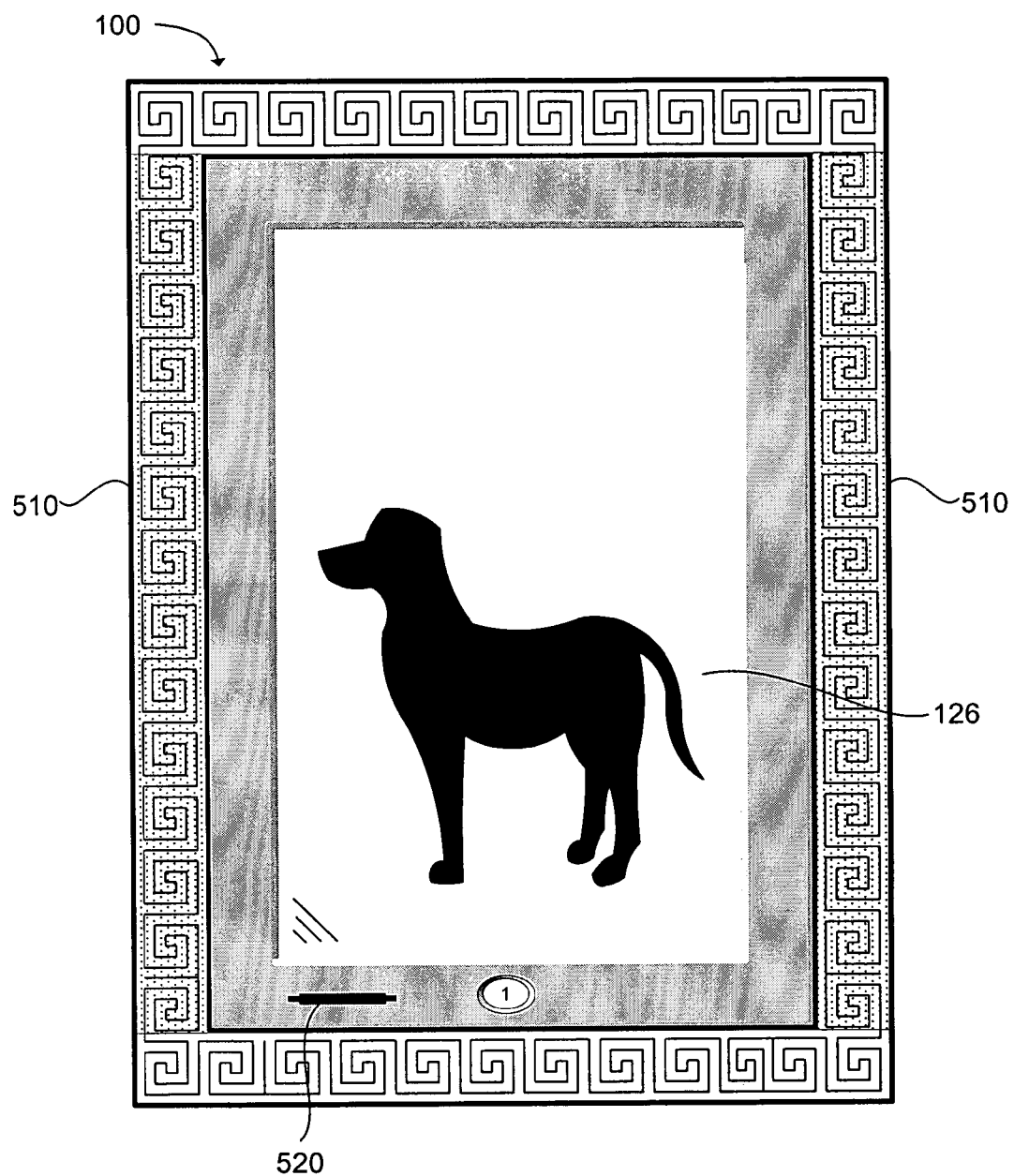
FIG. 5 shows an internal display object that can reside behind the touch panel in accordance with an embodiment for the present invention.

The touch panel 208 can be used to control and access electronic systems and components throughout a structure such as a house, building, or warehouse. The electronic systems and components can be controlled while the touch panel is in the touch panel cradle 100, as shown in FIG. 3. Alternatively, the touch panel 208 can be removed from the cradle, as shown in FIGS. 4 and 5, to reveal the display object 126 on the display mount 130 (FIG. 1). The display object 126 can be a graphical display such as a picture, an alphanumeric display such as a saying or a message, or an electronic display. A transparent cover 410, such as glass or plastic, can be placed over the display object to provide protection.

As electronic displays become more ubiquitous and less expensive, an electronic display can be incorporated into the display mount as the display object 126. The electronic display can be a relatively inexpensive means for providing a visual display when the touch panel is not located within the touch panel cradle. The electronic display can comprise a flat panel display, a cathode ray tube display, or a rear projection display. The flat panel display can be a liquid crystal display, a plasma display, or an organic light emitting diode display. The rear projection display can be a spatial light modulator display, a liquid crystal projection display, or a liquid crystal on silicon display. The electronic display can include any type of electronic device capable of displaying visual information. The electronic display can be used to exhibit graphical displays such as pictures or video, alphanumeric displays, such as a saying or a message, and so forth. Internal or external speakers 510 can also be coupled to the display to enable audiovisual presentations when the touch panel is not located within the surface-mount touch panel cradle 100. A solid state memory reader 520 can be electrically coupled to the electronic display and/or speakers to provide digital content such as audio, video, digital pictures, and so forth.

Returning to FIG. 1, the surface-mount touch panel cradle 100 can be made of an electromagnetically transmissive material such as plastic to allow transmission of electromagnetic signals. Specifically, the receptacle 110, the cradle frame 120, and the display mount 130 can be substantially formed of electromagnetically transmissive material. The material can enable the surface-mount touch panel cradle and/or touch panel to send and receive electromagnetic signals to facilitate wireless radio frequency communications with electronic devices about a structure such as a home, building, or warehouse.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A surface-mount touch panel cradle for use in electrically controlling remote components, comprising:
   a surface mounted receptacle;
   a cradle frame coupled to the receptacle;
   a display mount located within the receptacle and configured to move away from the cradle frame to allow a touch panel to be received within the receptacle, wherein the display mount is biased to be substantially flush with the cradle frame when the touch panel is removed from the receptacle and the cradle frame is closed;
   a frame biasing mechanism configured to move the cradle frame away from the display mount to enable the touch panel to be inserted and removed from the receptacle;
   an electrical connection located within the receptacle, the electrical connection configured to be electrically coupled to the touch panel; and
   an indicator coupled to the surface-mount touch panel cradle, identifying one of a plurality of touch panel cradles in which the touch panel is located.

2. The surface-mount touch panel cradle of claim 1, further comprising an external frame configured to be coupled to the cradle frame.

3. The surface-mount touch panel cradle of claim 2, wherein the external frame is designed to provide a decorative covering for the cradle frame.

4. The surface-mount touch panel cradle of claim 1, wherein the electrical connection comprises an electrical source for supplying power to the touch panel.

5. The surface-mount touch panel cradle of claim 4, wherein the electrical source supplies power to a rechargeable energy source located within the touch panel.

6. The surface-mount touch panel cradle of claim 1, wherein the electrical connection comprises a signal source for communicating with electronic devices external to the receptacle.

7. The surface-mount touch panel cradle of claim 1, wherein the surface-mount touch panel cradle is configured to receive a wireless signal to enable the touch panel to communicate with electronic devices and systems external to the receptacle.

8. The surface-mount touch panel cradle of claim 1, wherein the display mount is biased using a display biasing mechanism selected from the group consisting of spring, a pneumatic control, a hydraulic control, and an electric motor.

9. The surface-mount touch panel cradle of claim 1, wherein the cradle frame can be moved away from the display mount using a frame biasing mechanism selected from the group consisting of a spring, gravitational force, a pneumatic control, a hydraulic control, and an electric motor to enable the touch panel to be inserted and removed from the receptacle.

10. The surface-mount touch panel cradle of claim 1, wherein the display mount is configured to receive a display object selected from the group consisting of a graphic display, a picture, an alphanumeric display, a saying, a message, and an electronic display.

11. The surface-mount touch panel cradle of claim 10, further comprising a transparent surface placed over the display mount, configured to protect the display object.

12. The surface-mount touch panel cradle of claim 10, wherein the electronic display is selected from the group consisting of a flat panel display, a cathode ray tube display, and a rear projection display, wherein the flat panel display is selected from the group consisting of a liquid crystal display, a plasma display, and an organic light emitting diode display, and the rear projection display is selected from the group consisting of a spatial light modulator display, a liquid crystal projection display, and a liquid crystal on silicon display.

13. The surface-mount touch panel cradle of claim 10, further comprising a speaker electronically coupled to the electronic display to enable audiovisual audio presentations when the touch panel is not located within the receptacle.

14. The surface-mount touch panel cradle of claim 10, further comprising a solid state memory reader electronically coupled to at least one of the electronic display and a speaker to provide digital content.

15. A surface-mount touch panel cradle for use in electrically controlling remote components, comprising:
   a surface mounted receptacle;
   a cradle frame coupled to the receptacle;
   an external frame configured to be coupled to the cradle frame;
   a touch panel configured to be inserted into the receptacle;
   a display mount located within the receptacle and configured to slide away from the cradle frame to allow the touch panel to be received within the receptacle, wherein the display mount is biased to be substantially flush with the cradle frame when the touch panel is removed from the receptacle and the cradle frame is closed;
   a frame biasing mechanism configured to move the cradle frame away from the display mount to enable the touch panel to be inserted and removed from the receptacle;
   an electrical connection located within the receptacle, the electrical connection configured to be electrically coupled to the touch panel; and
   an indicator coupled to the surface-mount touch panel cradle, identifying one of a plurality of touch panel cradles in which the touch panel is located.

16. A touch panel cradle for use in electrically controlling remote components, comprising: a receptacle; a cradle frame coupled to the receptacle; a display mount located within the receptacle and configured to move away from the cradle frame to allow a touch panel to be received within the receptacle; a frame biasing mechanism configured to move the cradle frame away from the display mount to enable the touch panel to be inserted and removed from the receptacle; and an indicator coupled to the touch panel cradle, identifying one of a plurality of touch panel cradles in which the touch panel is located.

17. The touch panel cradle of claim 16, further comprising an electrical connection located within the receptacle, the electrical connection configured to be electrically coupled to the touch panel.

18. The touch panel cradle of claim 17, wherein the display mount is biased to be substantially flush with the cradle frame when the touch panel is removed from the receptacle and the cradle frame is closed.

* * * * *